United States Patent [19]

Yang et al.

[11] Patent Number: 5,782,959
[45] Date of Patent: Jul. 21, 1998

[54] PROCESS FOR PREPARING A COMPOSITE INORGANIC MEMBRANE FOR HYDROGEN SEPARATION

[75] Inventors: Seung-Man Yang; Seung-Bin Park, both of Taejon; Seung-Jin Lee; Sang-Yon Lee, both of Seoul, all of Rep. of Korea

[73] Assignee: Korea Advanced Institute of Science and Technology, Taejon, Rep. of Korea

[21] Appl. No.: 669,005

[22] Filed: Jun. 21, 1996

[30] Foreign Application Priority Data

Jun. 23, 1995 [KR] Rep. of Korea ............... 1995-17060

[51] Int. Cl.$^6$ ................. B01D 53/22; B01D 71/02
[52] U.S. Cl. ................. 96/11; 95/56; 55/524; 55/DIG. 5
[58] Field of Search ............... 95/55, 56; 96/4, 96/10, 11; 55/524, DIG. 5

[56] References Cited

U.S. PATENT DOCUMENTS

| | | | |
|---|---|---|---|
| 4,349,356 | 9/1982 | Wakao | 95/55 X |
| 4,689,150 | 8/1987 | Abe et al. | 96/11 X |
| 5,139,540 | 8/1992 | Najjar et al. | 95/55 X |
| 5,160,352 | 11/1992 | Najjar et al. | 95/55 X |
| 5,181,941 | 1/1993 | Najjar et al. | 95/56 X |
| 5,183,482 | 2/1993 | Najjar et al. | 95/55 X |
| 5,205,841 | 4/1993 | Vaiman | 95/56 X |
| 5,217,506 | 6/1993 | Edlund et al. | 95/56 |
| 5,259,870 | 11/1993 | Edlund | 95/56 |
| 5,342,431 | 8/1994 | Anderson et al. | 96/4 X |
| 5,393,325 | 2/1995 | Edlund | 95/56 |
| 5,415,891 | 5/1995 | Liu et al. | 95/55 X |
| 5,429,743 | 7/1995 | Geus et al. | 96/4 X |
| 5,487,774 | 1/1996 | Peterson et sl. | 96/11 X |
| 5,498,278 | 3/1996 | Edlund | 95/56 X |
| 5,614,001 | 3/1997 | Kosaka et al. | 95/55 X |

FOREIGN PATENT DOCUMENTS

| | | | |
|---|---|---|---|
| 3332346 | 4/1985 | Germany | 95/56 |
| 53-043153 | 11/1978 | Japan | 95/56 |
| 61-238303 | 10/1986 | Japan | 96/11 |
| 63-171617 | 7/1988 | Japan | 96/11 |

OTHER PUBLICATIONS

S.Y. Lee et al., Preparation of Sol–Gel Driven Alumina Membrane Modified by Soaking and Vapor–Deposition Method, J. Membrane Sci., 108:97–105(1995).

*Primary Examiner*—Robert Spitzer
*Attorney, Agent, or Firm*—Darby & Darby

[57] ABSTRACT

The present invention relates to a process for preparing a composite inorganic membrane for hydrogen separation, more specifically, to a process for preparing a composite inorganic membrane for hydrogen separation which comprises formation of intermediate layer in an asymmetric porous alumina support by sol-gel method, and modification of pores of the alumina membrane by soaking palladium acetate solution into the pores and vapor-deposition to enhance the permeability and selectivity for hydrogen. A process for preparing an inorganic membrane for hydrogen separation comprises the steps of: (i) dip-coating an alumina support in alumina sol containing a palladium precursor which is uniformly dispersed while vacuumizing the inside of the support, to form an intermediate layer of thin palladium impregnated alumina membrane; (ii) soaking the membrane obtained in step(i) in the palladium precursor solution, drying it under vacuum for 2 to 4 hours, and vaporizing the soaked materials with the gradual increase of temperature up to 170° to 190° C. for the vaporized palladium precursor to be deposited onto the pores; and, (iii) heating the alumina membrane whose pores are deposited with palladium at 290° to 310° C. while vacuumizing the inside of the support.

8 Claims, 5 Drawing Sheets

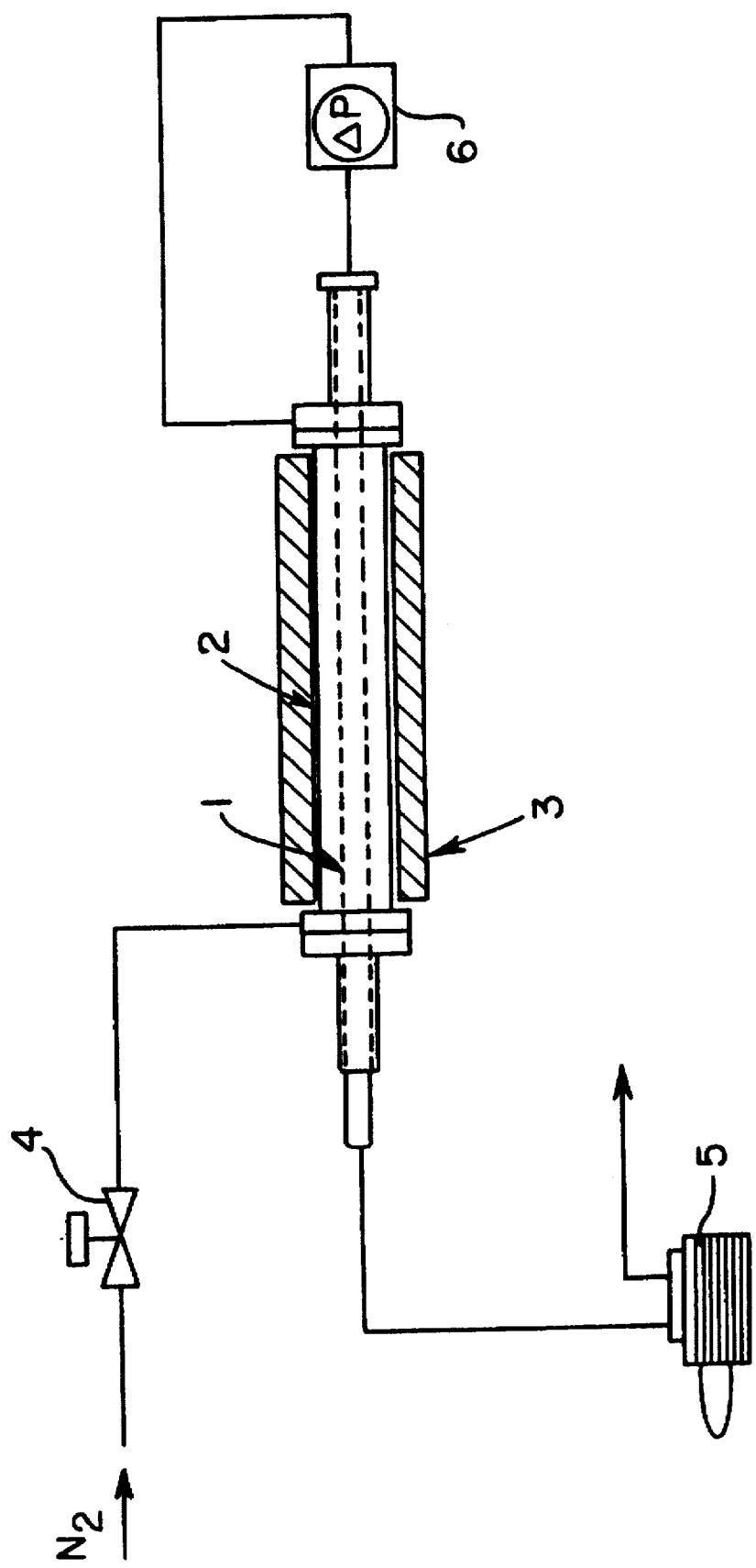
FIG. I

PROCESS FOR PREPARING A COMPOSITE INORGANIC MEMBRANE FOR HYDROGEN SEPARATION

FIELD OF THE INVENTION

The present invention relates to a process for preparing a composite inorganic membrane for hydrogen separation, more specifically, to a process for preparing a composite inorganic membrane for hydrogen separation which comprises formation of intermediate layer in an asymmetric porous alumina support by sol-gel method, and modification of pores of the alumina membrane by soaking palladium acetate solution into the pores and vapor-deposition to enhance the permeability and selectivity for hydrogen.

BACKGROUND OF THE INVENTION

A variety of separatory membranes have been used for the recovery of hydrogen from reaction products of coal gasification or exhaust gas streams in an effort to seek alternative energy source.

Polymeric materials which have been frequently employed as the separatory membranes for gas separation, have revealed shortcomings that they essentially require an auxiliary cooling system for the separation of high temperature hydrogen gas, which, in turn, results in inefficient separation, increase of cost, and short life owing to low chemical resistance. In this regard, membranes employing inorganic materials such as alumina have been actively studied to solve the said problems of prior art polymeric membranes, since the inorganic membranes possess superior chemical and thermal stability relative to the polymeric membranes, which, in turn, guarantees their effective use for high temperature hydrogen separation.

In general, the inorganic membranes for hydrogen separation are classified into porous and non-porous membranes by the presence/absence of micropores. Non-porous inorganic membranes have been prepared by chemical vapor deposition (CVD) method, sol-gel method, electrodeless plating, and spray pyrolysis of metal-organic. Several processes for preparing the non-porous inorganic membranes have been suggested in the art:

U.S. Pat. No. 5,358,553 teaches a process for preparing non-porous membrane by vapor deposition of palladium and platinum membrane employing CVD of multi-porous carbon support. The non-porous membrane of the prior art provides relatively high hydrogen selectivity, but low efficiency of separation owing to low permeability for hydrogen.

On the other hand, Yan, S. et al. disclose a process for preparing non-porous membrane by the formation of palladium layer on the outer surface of alumina support employing MOCVD (metal-organic CVD) method (see: Yan, S. et al., Ind. Eng. Chem. Res., 33:616 (1994)). Said non-porous inorganic membrane provides high hydrogen selectivity and moderate permeability, but possesses difficulty in forming thin membrane with uniform distribution of palladium when the size of membrane is large.

To solve said problems of non-porous membranes, various approaches for pore modification have been explored by impregnating catalytic materials of high hydrogen selectivity into pores of membranes to give membranes with a high selectivity and permeability, some of which are as follows:

Uhlhorn, R. J. R., et al. describe a process for preparing inorganic membrane by the aid of reservoir method which comprises impregnating a mixed solution containing metal catalyst such as copper into pores of alumina support, and drying to coat the catalyst on the pores of the support (see: Uhlhorn, R. J. R. et al., J. Material Sci., 27:538 (1992)). According to the said process, since the catalyst is coated on the porous membrane of support simply by drying the mixed solution of catalyst impregnated into the support, uniform coating of catalyst can not be realized. Moreover, it has revealed that: the selectivity of the membrane decreases below the value given by the ideal Knudsen diffusion as the pressure difference increases, although the membrane exhibits much higher hydrogen selectivity than conventional porous alumina membranes at a low transmembrane pressure.

Under the circumstances, there are strong reasons for exploring and developing a method for modification of the pores of supported inorganic membrane in practically large size and a process for preparing inorganic membranes for hydrogen separation which has a reasonably enhanced separation efficiency without significant reduction of the gas permeability compared with that obtained for the porous membrane without modification.

SUMMARY OF THE INVENTION

In accordance with the present invention, the inventors developed a novel process for preparing a composite inorganic membrane for hydrogen separation and prepared a practical gas separation supported membrane which can give a high permeability and reasonable separation efficiency.

The primary object of the present invention is, therefore, to provide a process for preparing a composite inorganic membrane which has a high permeability and selectivity for hydrogen even when the transmembrane pressure is high.

BRIEF DESCRIPTION OF THE DRAWINGS

The above and the other objects and features of the present invention will become apparent from the following description given in conjunction with the accompanying drawings, in which:

FIG. 1 is a schematic diagram showing a vapor deposition apparatus employed for the preparation of an inorganic membrane for hydrogen separation.

DETAILED DESCRIPTION OF THE INVENTION

Figure 2A:
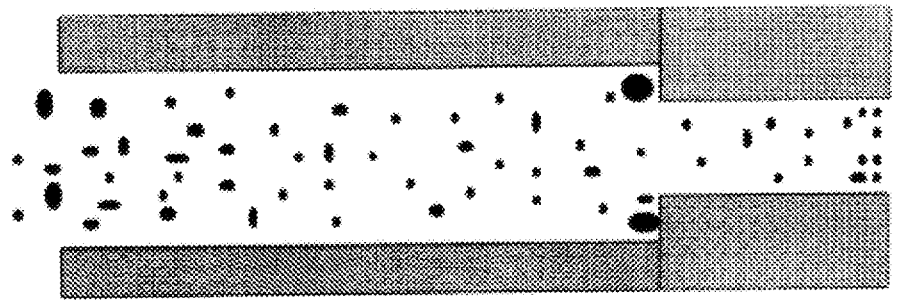
FIGS. 2(A) to 2(C) are schematic illustrations of soaking and vapor-deposition (SVD) procedure in accordance with the invention.

In accordance with the present invention, catalytic material is impregnated in the pores of supported inorganic membrane to enhance hydrogen selectivity compared with the inorganic membranes without modification. Further, since the structure of the membrane is not altered by modification with the catalytic material, the permeability is not decreased at all. The membrane of the present invention consists of asymmetric alumina support, sol-gel driven alumina intermediate membrane layer and impregnated palladium in the pores of membrane layer.

In case of the conventional supported membranes, the separatory layer is coated on the outer layer of the support. However, the membrane of the invention has the separatory layer in the form of intermediate layer as a result of vacuumizing of inside of the support in the course of coating and vaporization. This type of membrane with intermediate layer has an advantage with regard to poisoning of doped catalyst by the impurities. Additionally, in the case of conventional catalyst impregnated membrane, the amount of expensive noble metal catalyst such as palladium to be impregnated can not be controlled. However, in the present membrane, it can be easily controlled since the catalytic materials are mixed in the solution phase or immersed as precursor solution.

Particularly, the proposed catalyst impregnated inorganic membrane shows the enhanced hydrogen selectivity compared with the inorganic membranes without further modification with catalytic materials. Furthermore, the permeabilities of gases are not decreased by the modification unlike the membranes modified with the methods such as chemical vapor deposition, thermal spray and electrodeless plating, which is of practical importance.

The composite inorganic membrane of the present invention is prepared by the following steps.

Step 1: Formation of an intermediate layer of thin palladium impregnated alumina membrane The technique used in Step 1 is a sol-gel method by which an inorganic membrane layer can be formed in the pores of support. A porous alumina support is dipped in alumina sol containing a palladium precursor which is uniformly dispersed by sonication. During dip-coating, inside of the support is vacuumized so that the alumina sol can penetrate easily into the pores of the coarse outer layer. This procedure forms an intermediate layer of thin palladium impregnated alumina membrane in the vicinity of the boundary between the two layers of the support. In this regard, said alumina sol is prepared from alkoxide compound by the conventional method known in the art (see: Yoldas, B. E., Ceramic Bulletin, 54(3):289 (1975)).

In accordance with the invention, various shaped and sized porous supports may be used as the alumina support, though tubular-type support is preferably employed, and an asymmetric support consisting of the thin and dense inner layer having small pores and the thick and coarse outer layer having relatively large pores to maintain mechanical stiffness is the most preferably employed.

On the other hand, palladium chloride ($H_2PdCl_4$) is preferably used as the palladium precursor, and sonication which is a diffusion method using high-frequency waves is employed for uniform diffusion when palladium precursor is dispersed in the alumina sol. This step is repeated until the supported membranes have a hydrogen selectivity near to one given by Knudsen flow (3.74 for hydrogen and nitrogen).

Step 2: Soaking and vapor deposition (SVD)

The membrane obtained by the sol-gel method in Step 1 is immersed in the palladium precursor solution so that the membrane pores can act as a reservoir of metal-organic precursor. Then, the inner side of the membrane is placed under a vacuum condition and dried for 2 to 4 hours. Then, the soaked materials are vaporized, with the gradual increase of temperature up to 170° to 190° C. for the vaporized palladium precursor to be deposited onto the pores. In this step, palladium acetate dissolved in a mixture of acetone and HCl is preferably used as the soaking solution of palladium precursor, and drying is made in the air or drying oven.

When the alumina membrane is immersed in the soaking solution, the soaking solution penetrates into the inner side of the membrane by the action of capillary force, and placing under a vacuum before the solution is dried, facilitates deposition of palladium precursor into the inner side of membrane. Preferably, the temperature is gradually elevated under a nitrogen stream passing through from outside to inside of the membrane at a regular interval to ease pore modification.

In accordance with this distinctive step of pore modification, the palladium particles uniformly impregnated in the alumina membrane by the sol-gel method, act as seeds for the deposition of Group VIII noble metal precursor. The present inventors named this second step as soaking and vapor-deposition (SVD).

Step 3: Heat treatment

The alumina membrane whose pores are deposited with palladium in Step 2, is heated at 290° to 310° C. while vacuumizing the inside of the support so that the palladium particles can be deposited completely onto the pores, finally to produce a composite inorganic membrane for hydrogen separation.

FIG. 1 is a schematic diagram showing vapor deposition apparatus used for the preparation of inorganic membrane for hydrogen separation. This apparatus comprises a reactor (2) to deposit palladium into the membrane of an alumina support (1); an electric furnace (3) to heat the alumina support (1); a mass flow controller (4) to control the flow rate of nitrogen stream to be supplied to the inner side of the support (1); and, vacuum pump (5) to vacuumize the inside of the support (1). If a differential pressure gauge (6) attached to the one side of the alumina support (1) is employed, the apparatus can be also used in the experiment of gas permeability of separation membrane.

Figure 2B:
Figure 2C:
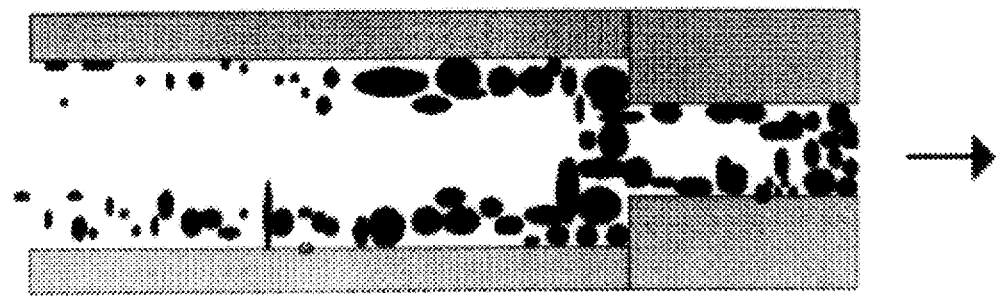

FIGS. 2(A) to 2(C) are schematic illustrations showing novel SVD and heat treatment process in accordance with the invention, where arrows show the direction of vacuumizing. Palladium precursor in the mixed solution penetrates into the alumina membrane by said soaking process as shown in FIG. 2(A), palladium is deposited onto pore wall of the membrane by said vapor-deposition process as shown in FIG. 2(B), and palladium is decomposed into palladium metal by heat treatment as shown in FIG. 2(C).

The present invention is further illustrated in the following examples, which should not be taken to limit the scope of the invention.

EXAMPLE 1

The porous support used was an alumina tube (Noritake Co., Japan) whose length is 50 cm, outer diameter 10 mm, inner diameter 7 mm, and pore size 0.08 micron, having an asymmetric structure consisting of a thin and dense inner layer and a thick and coarse outer layer. According to the sol-gel method, the support was dipped in alumina sol containing a palladium precursor which was uniformly dispersed by sonication, while vacuumizing the inside of support so that the alumina sol could penetrate easily into the pores of the coarse outer layer. Said procedure was repeated until value of hydrogen selectivity reached near to 3.74, one given by Knudsen flow, to form an intermediate layer of thin palladium impregnated alumina membrane in the vicinity of the boundary between said two layers of the support.

The membrane prepared by the sol-gel method was immersed in the palladium acetate solution in a mixture of acetone and HCl so that the membrane pores act as a reservoir of metal-organic precursor. Then, by the aid of the vapor-deposition apparatus of FIG. 1, the inner side of the alumina membrane which was soaked with the palladium precursor was vacuumized so that the palladium precursor could penetrate into the pores, and dried for 3 hours in the air or drying oven. Then, the palladium precursor was vaporized with the gradual increase of temperature up to 180° C. under a nitrogen stream passing through from outside to inside of the membrane, which resulted in deposition of the vaporized palladium precursor onto the pores.

The alumina membrane in which pores were deposited with palladium, was heated at 300° C. while vacuumizing the inside of the support, finally to produce an inorganic membrane for hydrogen separation.

Figure 3A:
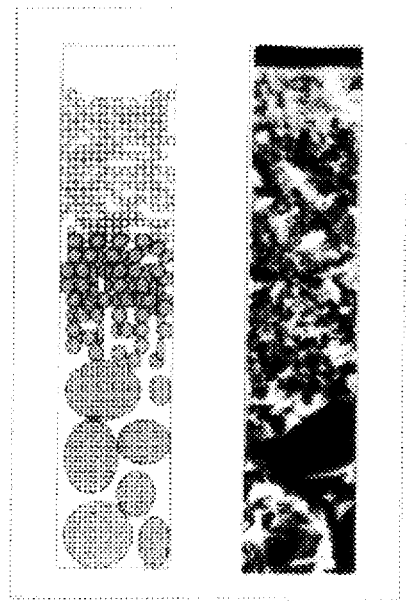
FIG. 3(A) is a scanning electron microscopy microphotograph showing cross-section of alumina support.
Figure 3B:
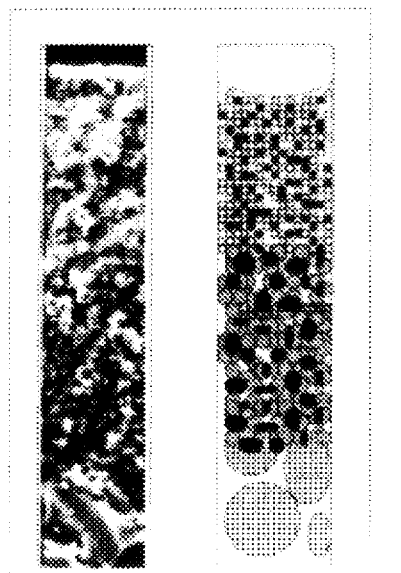
FIG. 3(B) is a scanning electron microscopy microphotograph showing cross-section of sol-gel driven membrane before SVD modification.
Figure 4:
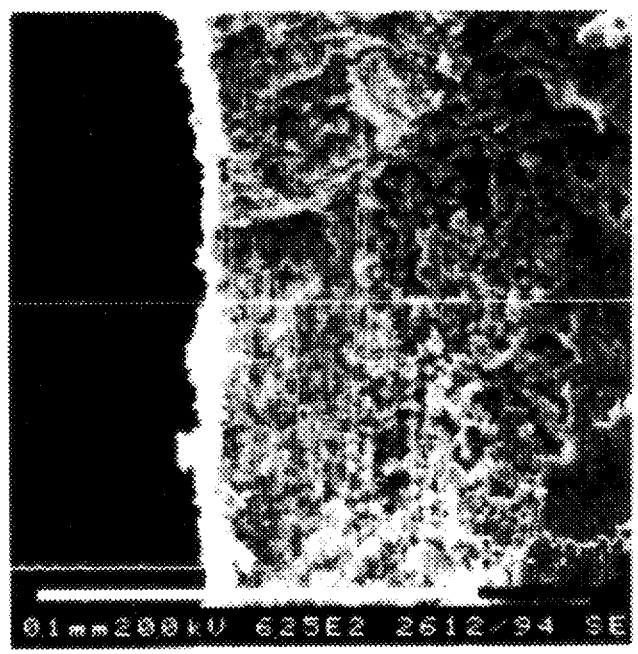
FIG. 4 is a scanning electron microscopy microphotograph of the sol-gel driven membrane modified by the novel SVD method and the distribution of palladium.

FIGS. 3(A) and (B) show scanning electron microscopy microphotographs and diagrams according to the microphotographs: FIG. 3(A) shows ones of cross-section of the alumina support, and FIG. 3(B) shows ones of cross-section of sol-gel driven membrane before SVD modification. FIG. 4 is a scanning electron microscopy microphotograph of cross-section of sol-gel driven membrane modified by the SVD method of the invention, where white line shows EDX (energy dispersive X-ray analysis) result. As can be seen in FIG. 4, the peak shows the relative amount of deposited palladium, and most of the palladium particles are present in the thin intermediate layer between the inner and outer layers of the support. Therefore, the inorganic membrane of the invention for hydrogen separation, unlike the conventional inorganic membranes, has an advantage with regard to poisoning of doped catalyst by the impurities and an enhanced durability since it has a separatory layer in the form of intermediate layer.

EXAMPLE 2

To investigate the effect of sonication on the dispersion of palladium precursor in the alumina membrane, an inorganic membrane for hydrogen separation was prepared in the same manner as in Example 1 except for not employing the sonication method.

In the hydrogen adsorption experiment employing the inorganic membrane thus prepared, dispersiveness of palladium can be estimated from the relationship of hydrogen pressure within the container for adsorption with the amount of adsorbed hydrogen. From the hydrogen adsorption experiments of the inorganic membranes prepared in Examples 1 and 2, it was found that dispersiveness of palladium in the alumina support with sonication was 2 times higher than one without sonication, and size of the palladium particle was also half of one of the mechanically mixed palladium, which gives the better chance of hydrogen to meet palladium and results in saving the precious noble metal.

The hydrogen separation power of the inorganic membrane

The separation power, in general, is defined as the separation efficiency of a membrane for a specific gas, whose dimension is the same as the permeability since it is the multiplication of separation factor relative to the other gas and the permeability of the object gas. The unit of the separation used either case is [CC(STP)/cm$^2$-min-atm over nitrogen]. As the gas selectivity competes with the permeability in the membrane separation processes, usually the membranes have almost similar separation power, thus, relatively high value of the separation power represents good separation efficiency of the inorganic membrane.

Figure 5:
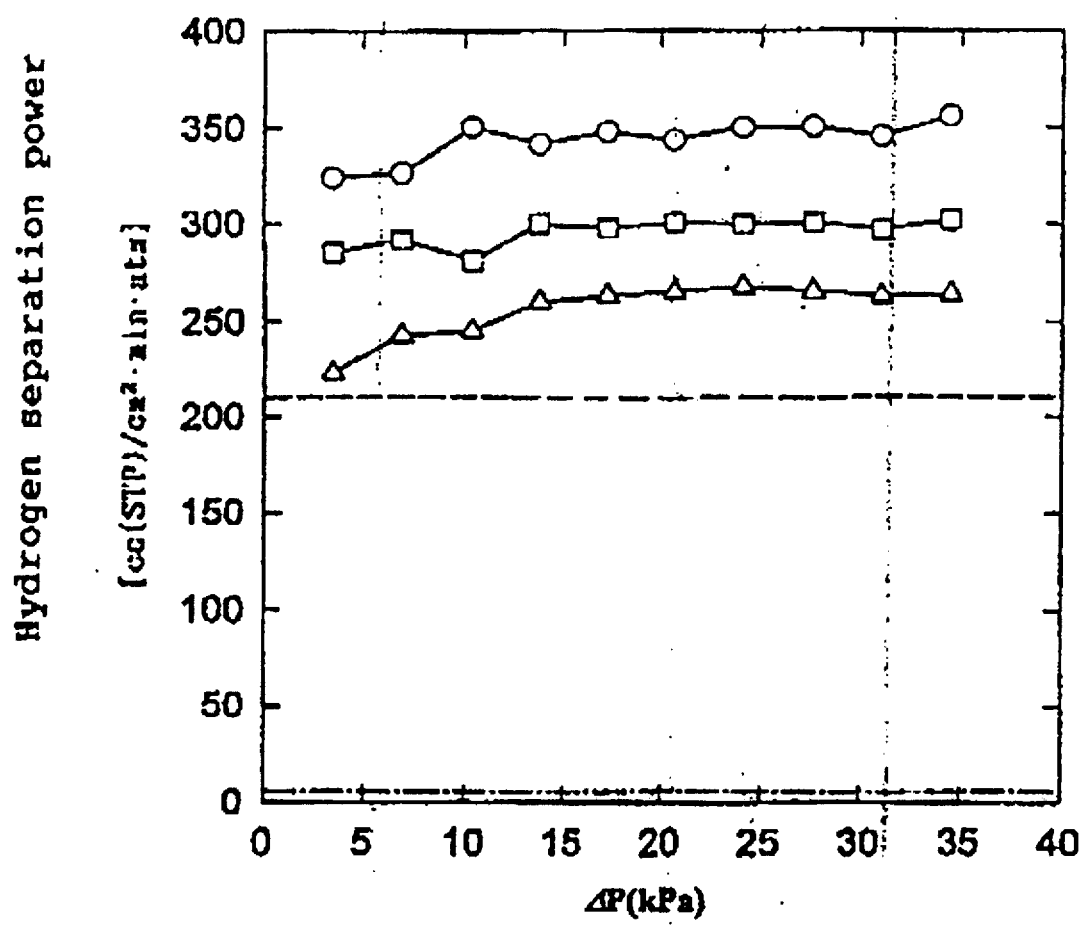
FIG. 5 is a graph showing the hydrogen separation power of the prior art membrane and the composite inorganic membrane of the invention.

Hydrogen separation power of the inorganic membrane of the invention prepared in Example 1 was evaluated by the test using nitrogen as a comparative gas with the change of temperature and pressure. FIG. 5 shows the comparison of hydrogen separation power of the inorganic membrane of the invention with ones of the conventional Vycor™ glass (Corning Glass Works, U.S.A.) and γ-alumina membrane prepared by sol-gel method.

In FIG. 5, a broken line (---) shows hydrogen separation power of γ-alumina membrane, and a broken line with dots (-·-) does one of Vycor™ glass employing ideal selectivity. Circle, square, and triangle indicate hydrogen separation power of the inorganic membrane of the invention at 400° C., 200° C., and 50° C., respectively. As shown in FIG. 5, hydrogen separation powers of Vycor™ glass, γ-alumina membrane, and the inorganic membrane of the invention are 2.6, 200, and 230 to 360, respectively. Thus, it was clearly determined that the inorganic membrane of the invention possesses excellent hydrogen separation efficiency, and it can be used effectively at a high temperature and pressure since its hydrogen separation power increases with the increase of temperature and pressure.

As clearly illustrated and demonstrated above, the present invention provides a process for preparing a composite inorganic membrane, which has a high permeability and selectivity for hydrogen even when the transmembrane pressure is high. The composite inorganic membrane of the invention can be used efficiently for the recovery of hydrogen from the coal gasification products or exhaust gas streams without cooling procedure.

Although the preferred embodiments of the present invention have been disclosed for illustrative purpose, those who are skilled in the art will appreciate that various modifications, additions and substitutions are possible, without departing from the scope and spirit of the invention as disclosed in the accompanying claims.

What is claimed is:

1. A process for preparing an inorganic membrane for hydrogen separation which comprises the steps of:
   (i) dip-coating an alumina sol on an alumina support said alumina sol having a palladium precursor which is uniformly dispersed therein, an inside of said alumina support being vacuumized, said alumina sol thereby forming an intermediate layer of thin palladium impregnated alumina membrane having pores;
   (ii) immersing the membrane obtained in step (i) in a soaking solution of palladium precursor, drying the palladium precursor soaked membrane under vacuum for 2 to 4 hours, and subjecting the soaked materials to a gradual increase of temperature up to 170° to 190° C. thereby vaporizing said palladium precursor solution and causing said palladium precursor to be deposited onto the pores of the alumina membrane; and,
   iii) heating the alumina membrane whose pores are deposited with palladium at 290° to 310° C. while vacuumizing the inside of the support.

2. The process for preparing an inorganic membrane for hydrogen separation of claim 1, wherein the alumina support is a tubular support having an asymmetric structure.

3. The process for preparing an inorganic membrane for hydrogen separation of claim 1, wherein the palladium precursor dispersed in an alumina sol is palladium chloride.

4. The process for preparing an inorganic membrane for hydrogen separation of claim 1, wherein the palladium precursor is dispersed in alumina sol by sonication.

5. The process for preparing an inorganic membrane for hydrogen separation of claim 1, wherein the soaking solution of palladium precursor comprises palladium acetate dissolved in a mixture of acetone and HCl.

6. The process for preparing an inorganic membrane for hydrogen separation of claim 1, wherein the temperature is gradually increased under a nitrogen stream passing through from an outside to the inside of the membrane.

7. The process for preparing an inorganic membrane for hydrogen separation of claim 1, wherein the soaking, vapor-deposition and heat treatment are carried out by employing an apparatus which comprises a reactor to deposit palladium into the membrane of an alumina support; an electric furnace to heat the alumina support; a mass flow controller to control a flow rate of nitrogen to be supplied to the inner side of the support; and, a vacuum pump to vacuumize the inside of the support.

8. An inorganic membrane for hydrogen separation produced by claim 1, which has a separatory layer comprising the intermediate layer between an inner dense layer and an outer coarse layer of the support.

* * * * *